July 20, 1926.
L. J. BRUNE, SR
1,593,545
VEHICLE JACK AND TIRE TOOL
Filed July 3, 1924
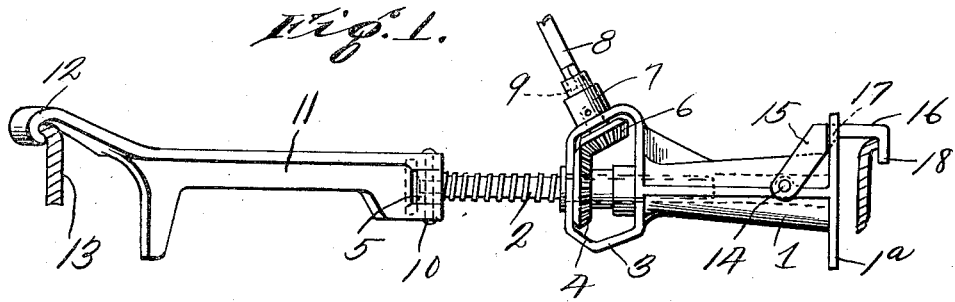
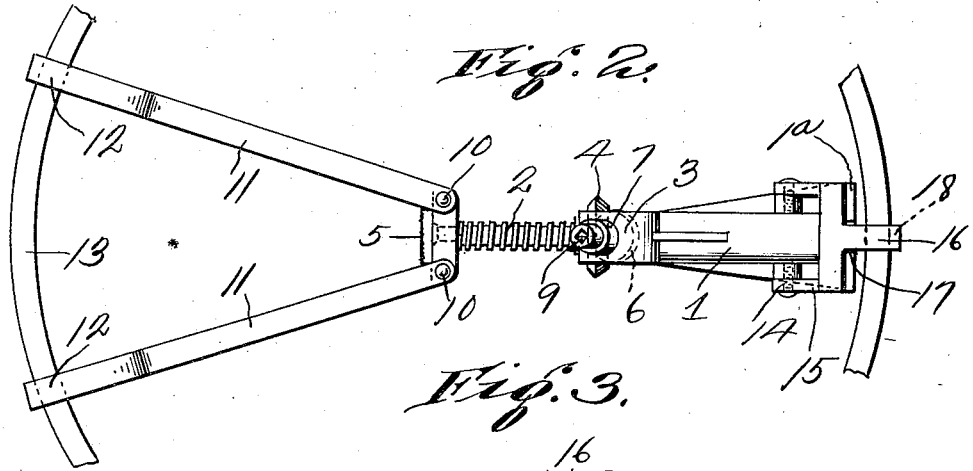
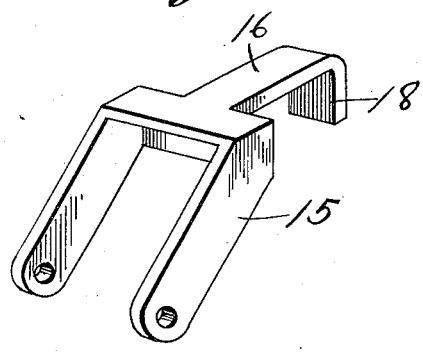
Inventor
L. J. Brune, Sr.
By D. Swift
Attorney Patented July 20, 1926.

1,593,545

UNITED STATES PATENT OFFICE.

LOUIS J. BRUNE, SR., OF NEW ORLEANS, LOUISIANA.

VEHICLE JACK AND TIRE TOOL.

Application filed July 3, 1924. Serial No. 724,012.

The invention relates to vehicle jacks and tire tools, and has for its object to provide a device of this character which may be used either as a vehicle jack or tire tool for contracting a rim.

A further object is to provide the base of the standard of the jack with a U-shaped member pivoted thereto, which U-shaped member terminates in an angularly shaped arm adapted to hook over one side of a rim when the device is used as a rim contractor. Also to provide said base with a recess for the reception of the angularly shaped arm when in extended position.

A further object is to pivotally mount on the outer end of the jack screw, a yoke, to which yoke rim engaging arms are pivotally connected, which arms in combination with the angularly shaped arm carried by the base of the jack form a three point gripping device for the rim during a contracting operation.

Also to provide the casing of the jack with a yoke through which the jack screw extends and a bevel gear on the screw within the yoke and with which bevel gear a second bevelled gear meshes, and which second bevelled gear is provided with an operating shaft whereby the same may be easily rotated.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the jack, and tire tool.

Figure 2 is a plan view of the device.

Figure 3 is a perspective view of the pivoted arm carried by the base of the jack.

Referring to the drawing, the numeral 1 designates the base of the jack, and in which base the jack screw 2 is slidably mounted. The base 1 of the jack adjacent its upper end is provided with a yoke 3, in which is disposed a bevelled gear 4, through which the jack screw 2 is threaded, therefore it will be seen that when the bevelled gear 4 is rotated the jack screw 2 will be axially moved, consequently when the axle engaging end 5 is in engagement with an axle, said screw will be moved for raising or lowering the axle according to the direction of rotation of the bevelled gear 4. Disposed within the yoke 3 is an operating gear 5, which gear is carried by the rotatable member 7, which receives the shaft 8 in the rectangular shaped socket 9 thereof. The shaft 8 may be any suitable kind of an operating shaft or wrench and it is obvious that when the same is rotated, rotation will be imparted to the bevelled gear 4 through the bevelled gear 6, and the jack screw 2 moved axially. The lower end of the base 1 is provided with a flange 1ª for forming a relatively large bearing surface for the jack during a vehicle jacking operation.

Pivotally connected at 10 to opposite sides of the axle engaging member 5 are arms 11, which arms are disposed in the same plane, and have their ends provided with hooks 12 adapted to hook over the demountable rim 13 at spaced points, but at one side of the rim, that is when the device is used as a rim contracting tool. Pivotally connected at 14 to opposite sides of the base 1 is a U-shaped member 15, which member extends outwardly and terminates in an angularly disposed arm 16, which when the device is used as a rim contractor is received in the recess 17 of the flange 1ª and extends beyond the underside of the flange and terminates in an inwardly extending arm 18 which engages over the marginal edge of the demountable rim 13, opposite the points of engagement of the hooks 12, therefore it will be seen when the operating gear 6 is rotated for rotating the bevelled gear 4, the jack shaft 2 will be moved into the base 1, consequently the arms 11 will be pulled towards the base 1 thereby contracting the rim. When the device is used as a jack the pivoted U-shaped member 15 is folded onto the base 1 to a position where arms 16 and 17 will not interfere with the base resting on the ground, at the same time the pivoted arms 11 are folded to positions at opposite sides of the jack proper where they will not interfere with the use of the device as a jack. When the device is not in use, it may be folded into a compact package which will not require any more room than the ordinary jack, and may be easily stored, and the necessity of carrying a jack and a rim contracting tool as independent tools is obviated.

The invention having been set forth what is claimed as new and useful is:—

A tire contracting tool comprising a casing, the outer end of said casing being provided with a flange forming a base, a threaded screw slidably mounted in the casing, a yoke carried by said casing, gears disposed within said yoke for axially moving the screw, rim gripping arms pivotally connected to the screw, an arm pivoted to the casing above and adjacent the base, said arm comprising spaced members at opposite sides of the casing, said spaced members inclining outwardly from the casing towards the base, said spaced members being connected together by a bar, an arm carried by said bar and extending through a recess in one side of the base and engaging the bottom of said recess, said last named arm being in parallel relation to the axis of the casing and an angularly disposed rim engaging member carried by said last named arm.

In testimony whereof I have signed my name to this specification.

LOUIS J. BRUNE, Sr.